United States Patent [19]

Jellinek et al.

[11] Patent Number: 4,701,478

[45] Date of Patent: Oct. 20, 1987

[54] RADIATION CROSS-LINKABLE BINDING AGENTS

[75] Inventors: Karl Jellinek, Iserlohn-Letmathe; Bert Meier, Wesel; Ulrich Grundke, Dulsburg, all of Fed. Rep. of Germany

[73] Assignee: RutgerswerkeAktiengesellschaft, Frankfurt am Main, Fed. Rep. of Germany

[21] Appl. No.: 835,474

[22] Filed: Mar. 3, 1986

[30] Foreign Application Priority Data

Mar. 9, 1985 [DE] Fed. Rep. of Germany ....... 3508450

[51] Int. Cl.⁴ .................. C08L 63/10; C08F 2/46; C08F 283/10
[52] U.S. Cl. .................. 522/97; 525/528; 525/920; 526/301
[58] Field of Search .......... 522/97; 526/301; 525/920, 528

[56] References Cited

U.S. PATENT DOCUMENTS

| | | | |
|---|---|---|---|
| 3,660,145 | 5/1972 | Johnson et al. | 525/920 |
| 4,064,194 | 12/1977 | Evans et al. | 526/301 |
| 4,162,274 | 7/1979 | Rosenkranz | 525/528 |
| 4,205,018 | 5/1980 | Nagasawa et al. | 522/97 |
| 4,210,713 | 7/1980 | Sumiyoshi et al. | 522/97 |
| 4,221,686 | 9/1980 | Satuyami et al. | 525/528 |
| 4,239,866 | 12/1980 | Reitel et al. | 522/97 |
| 4,295,947 | 10/1981 | Ohtani et al. | 525/920 |
| 4,390,662 | 6/1983 | Ando et al. | 525/920 |
| 4,618,658 | 10/1986 | Hefner, Jr. et al. | 525/528 |

*Primary Examiner*—John C. Bleutge
*Assistant Examiner*—David W. Woodward
*Attorney, Agent, or Firm*—Bierman and Muserlian

[57] ABSTRACT

Radiation cross-linkable binding agents formed by reacting first an epoxy component with more than one epoxy group per molecule with at least one carboxylic acid in a molar ratio 1 of epoxy group per 0.5 to 0.9 carboxyl groups and second reacting the said first reaction product with at least one unsaturated isocyanato carbamate ester prepared by reacting a compound containing at least two isocyanate groups with an ester of an acid selected from the group consisting of acrylic acid, methacrylic acid and cyanacrylic acid containing hydroxyl groups useful in electronics and electrotechnology for layering systems and cast resin materials.

6 Claims, No Drawings

RADIATION CROSS-LINKABLE BINDING AGENTS

STATE OF THE ART

Radiation cross-linked binding agents based on epoxy resins that are thermally curable are very important for the manufacture of photo-resists and protective lacquers. The cured epoxy resins have very good mechanical, thermal and chemical stability as well as excellent electrical properties. Therefore many attempts have been made to develop epoxy resin systems for electronics and electrotechnology which could be cross-linked by exposure to radiation.

The reaction of epoxy resins based on bisphenol A or Bisphenol F with acrylic acid or methacrylic acid results in resin binder systems that are capable of polymerization and cross-linking because of their content of unsaturated vinyl groups. Such binder systems are described, for example, in British Pat. No.1,006,587, U.S. Pat. No. 3,317,465 and in German disclosure No. 1,644,817. In combination with esters of acrylic acid or methacrylic acid or also styrene as active polymerizable vinyl monomer reactants, these reaction products are used as radiation curable coating materials or cast resins.

However, these systems are not suitable for the preparation of UV-light curing coating materials since their rate of cross-linking, especially in the presence of atmospheric oxygen, is too low for practical applications. When applied in thin layers, these materials have very tacky surfaces even after the curing. Other radiation cross-linkable coating materials based on reaction products of monoethylentically unsaturated carboxylic acids and bisphenol and/or novolac epoxy resins have the disadvantage of a relatively great instability, which requires inhibitors and their shelf-life is also short.

U.S. Pat. No. 2,635,929 describes the preparation of photopolymerizable epoxy resins which contain unsaturated groups of the chalcon type as the characteristic photopolymerizable unit. These binding agents are characterized by an improved mechanism of action, i.e. faster curing times, but they cannot be produced economically because of their complex structure. Moreover, the exposure of the chalcon structures to actinic light results mainly in cyclo-additions with the formation of cyclobutanes. The resulting relative low cross-linkage density can lead to negative dissolving or swelling phenomena, particularly in cases of aggressive chemicals during etching and soldering processes.

U.S. Pat. No. 3,956,043 describes a photosensitive epoxy resin that contains a photosensitive group in the molecule which can be used for the preparation of photoresists and protective lacquers. However, the disadvantage of this system is its relatively long exposure time which is caused by the high self-absorption of this binder system.

All existing binder systems curable by UV-light and heat, which are based on epoxy resins, have the disadvantages that they do not cure within economically possible periods or that they still have tacky surfaces after curing, or their shelf-life is too short, or that the polymerization reaction under the influence of UV-light takes place also in the areas where no exposure should occur (subsurface cross-linking).

OBJECTS OF THE INVENTION

It is an object of the invention to provide epoxy resin binder systems that can be cross-linked by ultraviolet light and that can be thermally cured and are free of the disadvantages of the prior art binder systems.

It is another object of the invention to provide novel coating systems and cast resin materials useful for resist pastes and solder stop lacquers based on the novel binder systems.

These and other objects and advantages of the invention will become obvious from the following detailed description.

THE INVENTION

The radiation cross-linkable binding agents of the invention are formed by reacting first an epoxy component with more than one epoxy group per molecule with at least one carboxylic acid in a molar ratio 1 epoxy group per 0.5 to 0.9 carboxy groups and second reacting the said first reaction product with at least one unsaturated isocyanato carbamate ester prepared by reacting a compound containing at least two isocyanate groups with an ester of an acid selected from the group consisting of acrylic acid, methacrylic acid and cyanacrylic acid containing hydroxy groups.

The reaction of epoxy resins with monocarboxylic acids and the cross-linking of the resulting reaction products with unsaturated isocyanato allyl (or methallyl) carbamates which are produced by reaction of polyisocyanates with a hydroxy-substituted allyl compound is known from German Pat. Ser. No. 2,343,085. These binder systems are cured by exposure to electron radiation to form a product with a high level of mechanical, chemical, thermal and electrical properties, but the curing rate of these binding agents is not adequate for their use for photo-cross-linking, and they are therefore used in mixtures together with other radiation curing monomers.

It is surprising that the binder systems of the invention are sufficiently active that their cross-linking rate is adequate even without additional radiation curing compounds, and that they are also stimulated by UV-radiation as well as by electron radiation to form cross-linkages, and that they react without subsurface cross-linking to form a non-tacky surface. The shelf-life of these binding agents is so good when they are protected against light that they do not require any addition of other stabilizers.

Basically all compounds containing more than one epoxy group per molecule are suitable as starting epoxy resins for radiation curable binder systems and they are obtained either by reaction of polyphenols or polyalcohols with epichlorohydrin, e.g. according to U.S. Pat. Nos. 2,467,171; 2,538,072; 2,558,959 and 2,694,694 or by reaction of polyunsaturated compounds with organic peracids as described in the U.S. Pat. Nos. 2,853,498; 2,853,499 and 2,829,135 for example.

Preferred are the reaction products of bisphenols A with epichlorohydrin in an alkaline medium as well as the polyglycidyl ethers of resorcinol, butanediol, hexanediol, glycerol, trimethyl propane and neopentyl glycol. Preferred polyunsaturated compounds epoxidized by peracids are epoxidated cycloolefins such as 3,4-diepoxy -6-methyltetrahydrobenzyl-3',4'-diepoxy-6'-methyltetrahydrobanzoate, vinylcyclohexane dioxide, a.o., as well as the diglycidyl esters based on anhydrides such as hexahydrophthalic acid anhydride or methylnadic acid anhydride.

Especially preferred are all novolacs whose phenolic hydroxyl groups are etherified with glycidiyl radicals, e.g. bisphenol-A- or bisphenol-F-novolac epoxy resins or in the corresponding o-cresol-epoxy resin novolac systems or corresponding p-cresol-epoxy resin novolac systems or corresponding chlorinated or brominated products to reduce the flammability. The novolacs useful for this purpose can be prepared, e.g., based on phenol, ortho-, meta- or p-cresol, dimethylphenols, phenols with higher alkylation, e.g. nonylphenol, tert-butylphenol, or halogenated phenols as well as polyphenols e.g., resorcinol, hydroquinone, pyrocatechin, pyrogallol, phloroglucine and trihydroxyphenylmethane or tetrahydroxyphenylethane, by reaction with aldehydes, preferably formaldehyde, with acid catalysts. These epoxy compounds have the formula

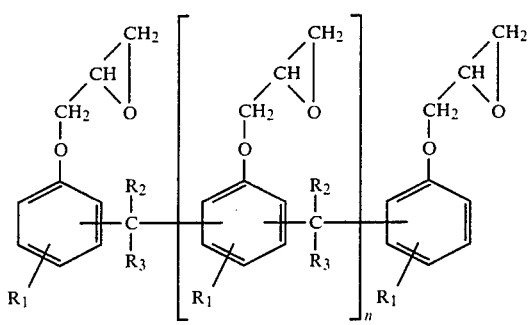 I wherein $R_1$ is selected from the group consisting of hydrogen, methyl, ethyl, butyl, bromine and chlorine, $R_2$ is hydrogen or methyl and $R_3$ is hydrogen or methyl.

Additions of mono- and bifunctional epoxy compounds, so-called reactive thinners, can be added to these epoxy resins before the reaction with carboxylic acids to improve the viscosity requirements.

All conventional moncarboxylic acids can be used as carboxylic acids and examples of these are the straight-chain monocarboxylic acids such as formic acid, acetic acid, propionic acid, lactic acid, stearic acid as well as branched carboxylic acids and aromatic carboxylic acids such as benzoic acid or cinnamic acid as well as phenylacetic acid and preferably unsaturated carboxylic acids of the type of acrylic or methacrylic acid which cause an increase in the density of the network.

The reaction is performed by a known method by stirring together the liquid or dissolved reactants at elevated temperature and important for the properties of the final product is the molar ratio of epoxy groups to carboxyl groups which must exceed 1 in any case, and free epoxy groups are present to make a thermal curing possible after the radiation cross-linking. The ratio is generally in the range of 1:0.5–0.9.

The reaction of the above-mentioned epoxy resin systems with the monocarboxylic acids results in reaction products that are exceptionally suitable for a further reaction with unsaturated isocyanatocarbamate esters which may be prepared by reacting polyisocyanates, e.g. 2,4- or 2,6-toluylene diisocyanates or also their isomer mixtures (trade names e.g. "Desmodur T 80"), methylenediphenyl diisocyanates, 1,6-hexamethylene diisocyanates, hexanediisocyanate, 1,5-naphthylene diisocyanate, isophorone diisocyanate, trimethylhexamethylene diisocyanate, 4,4′,4″-triphenylmethane tri- isocyanate or other known polyisocyanates with unsaturated esters containing hydroxyl groups.

Suitable as unsaturated esters containing hydroxy groups are preferably hydroxyethyl acrylate or hydroxypropyl acrylate or the corresponding hydroxymethacrylates or hydroxycyanacrylates as well as butanediol or hexandediol monoacrylates.

The reaction takes place in a known manner with equipmolar amounts. The unsaturated isocyanato carbamate esters have the formula

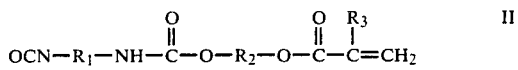 II wherein $R_1$ is 2,4 or 2,6-toluylene, 4,4′-diphenylmethylisophoronetrimethylhexamethylene, $R_2$ is $C_2H_4$—, $C_3H_6$—, $C_4H_8$—, 1,6-hexamethylene -ol 1,5-naphthylene and $R_3$ is H—, $CH_3$—, CN—, $C_2H_5$— or $C_3H_7$—.

The reaction of the carboxylic acid modified epoxy resins with the unsaturated isocyanato carbamate esters is carried out by known methods, and the amounts to be used are chosen so that the molar ratios of the hydroxyl groups present to the isocyanate groups lie in the range of 1:0.8 to 1:1. This reaction results in binder systems that are very storage stable and are still highly reactive to actinic radiation, which can be precross-linked and then thermally afterbaked in an exceptional manner by UV- or electron radiation in economically interesting short times, while reaching an extremely high level with regard to the mechanical and thermal properties as well as resistance to chemicals and the desired electrical characteristics. The average molecular weight can be adjusted at will to between 500 and 10,000 depending on the required properties.

Because of the nature of their reactions and their properties after curing, the binder systems of the invention are particularly suitable for the preparation of solder stop and protective lacquers for multilayer and printed circuits as well as cast materials for electronics and electrotechnology.

Optimally suitable are the binder systems in which novolacs are used as epoxy resins that have their phenolic hydroxyl groups etherified with glycidyls since the novolac/epoxy resin structures permit the specific attempt to produce high network densities which result in an especially high levels of mechanical and thermal properties as well as resistance to chemicals. The binder systems of the invention are also particularly suitable for the preparation of photo resist materials. The specific adjustment of the UV-reactivity can be achieved with the use of conventional photoinitiators, e.g. benzoins, or benzyldimethyl ketal, benzoin ether, benzophenones, dithiobis(benzothialzol), oxophosphorane and combinations of aromatic sulfochlorides with disulfides or xanthogenates to increase the rate of polymerization. Curing times of less than 30 seconds can be obtained without difficulty and the resulting films are not tacky and have a high level of mechanical, thermal and electrical properties and good resistance to chemicals.

The binder systems cross-linkable by radiation are further formulated preferaby by the addition of catalysts for thermal afterbaking for the preparation of I- or II- component coating systems. Suitable as latent catalysts for the thermal afterbake of the epoxy groups are, e.g., dicyandiamide or corresponding derivatives or $BF_3$- or also $BCl_3$-amino complexes. Especially advantageous as latent catalysts which act as photoinitiators during cross-linking and also as curing catalysts for the thermal curing are compounds of the Michler type that have the formula

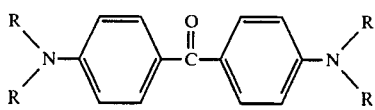

wherein R is methyl or ethyl which result in very short curing times of minutes at temperatures of 120°–230° C., depending on the glass transition point that is to be reached for the cured coating system.

For the preparation of photoresists, the said radiation cross-linkable, epoxy resin/binder system is applied in layers to load-bearing copper-clad insulation boards by the screen printing or casting curtain process from the melt or with the use of solvents. After drying or evaporation of the solvent, the resin is then exposed to actinic radiation through a negative or positive stencil which cures the exposed parts by polymerization, while the unpolymerized parts of the resin can be removed with a solvent. The said binder system cross-linkable by radiation is characterized particularly by the fact that the polymerization reaction induced by actinic radiation does not continue under the unexposed areas, i.e., no sub surface cross-linkage occurs. The unpolymerized parts of the resin are subsequently removed with a solvent. After the completed etching process, the lacquer remaining on the circuit pattern can be converted into a mechanically durable, chemically resistant and thermally and electrically high quality protective lacquer by thermal afterbake.

A particular characteristic of the invention in comparison with the conventional solder stop lacquers is the especially good adhesion on all printing substrates which is particularly apparent in the soldering process where the conventional UV-curing solder stop lacquers are only conditionally usable for printing on bright tin or lead/tin. Special characteristics of the lacquers are the very good capability for cover printing and over lacquering as well as the adhesion of subsequent printing, e.g. identification printings. The distinguishing characteristic of the invention is an especially good curing, even in troughs between very high circuit patterns and in especially favorable elasticity behavior, e.g. in the case of the ruling of gratings. Therefore, heat-resistant cover lacquers can be prepared as solder stop lacquer from the binder systems cross-linkable by radiation which can be used to cover with good adhesion selected areas of a circuit board so that no soldering tin is deposited during the subsequent soldering process. Complete soldering processes during which many soldering connections are made in a single operation are possible by this method without any problems.

In the following examples there are described several preferred embodiments to illustrate the invention. However, it should be understood that the invention is not intended to be limited to the specific embodiments.

EXAMPLE 1

STEP A: Reaction of epoxy resin and carboxylic acid 619 g (1.0 mole) of a phenol novolac epoxy resin with an epoxide number of 3.5 were placed in a 2 liter three neck flask equipped with a stirrer, a reflux condenser and a thermometer and after the addition of 200 g of xylol, the mixture was heated to 80° C. 129.5 g (1.75 moles) of propionic acid were added dropwise at 80° C. over 15 to 30 minutes and the mixture was stirred at 80° C. for three hours. The xylol was distilled and the residue was taken up in ethyl glycol acetate to form a solution containing 70% of the reaction product. The said solution had a viscosity of 2400 to 2500 mPa's at 25° C., a refractive index of 1.5200–1.5300 at 25° C., an acid number of less than 1 mg/g and an epoxy number of 8 to 10%.

STEP B: Reaction of polyisocyanate and unsaturated compounds with —OH groups 174 g (one mole) of a mixture of 2,4- and 2,6-toluylenediisocyanate (Desmodur T 80) were placed in a two liter three-necked flask equipped with a stirrer, a reflux condenser and a thermometer and 130 g of ethyl glycol acetate were added as a solvent. 116 g (one mole) of hydroxyethyl acrylate were added in portions over 30 minutes during which the temperature rose to about 80° C. The mixture was held at 80° C. for one hour and 0.1% of hydroquinone was added thereto as a stabilizer to obtain 420 g of 70% reaction product in ethyl glycol acetate.

STEP C: Binding Agent 887 g of the product Step B were added to a two liter three-necked flask equipped with a stirrer, a reflux condenser and a thermometer and after heating to 60° C., 860 g of the reaction product of Step A were added in portions over one hour. The mixture was held at 60° C. for one hour and was cooled to obtain a reaction product with a viscosity of 12,000 to 15,000 mPa's at 25° C., a refractive index of 1.5100 at 25° C. and a solids content of 70%. The product was stable after six months storage in the dark.

The pre-cross-linked product was resistant to the usual developing chemicals such as glycol ethers and glycol esters and the thermally cured product was resistant to acid and alkaline cleaning solutions and conventional dip soldering. The dielectric constants, dielectric loss factor, the insulation resistance and track resistance met the standard requirements for high quality multi layers.

EXAMPLE 2

STEP A: Reaction of epoxy resin with carboxylic acid 619 g (1.0 moles) of a phenol novolac epoxy resin with an epoxide number of 3.5 were placed in a two liter three-necked flask equipped with a stirrer, a reflux condenser and a thermometer and after the addition of 200 g of xylol, the mixture was heated to 80° C. 120 g (1.2 moles) of 90% lactic acid were added dropwise at 80° C. over 15 to 30 minutes and the mixture was stirred at 80° C. for two hours. The xylol was distilled and the resin was taken up in ethyl glycol acetate to form a solution containing 70% of the reaction product. The solution had a viscosity of 4,000 to 6,000 mPa's at 25° C., a refractive index of 1.5200–1.5300 at 25° C., an acid number of less than 1 mg/g and an epoxy number of 8 to 10%.

STEP B: Binding Agent 887 g of the product of Step B of Example 1 were placed in a two liter three-necked flask equipped with a stirrer, a reflux condensor and a thermometer and after heating the product to 60° C., 860 g of the product of Step A were added in portions at 60° C. over one hour.

The mixture was held at 60° C. for one hour and was then cooled to obtain a reaction product with a viscosity of 15,000 to 20,000 mPa's at 25° C., a refractive index of 1.5100–1.5200 at 25° C., a solids content of 70% and a shelf life of at least 6 months in the dark.

The pre-cross-linked product was resistant to the usual developing chemicals such as glycol ethers and glycol esters and the thermally cured product was resistant to methylene chloride, acid and alkaline cleaning agents and usual dip soldering. The dielectric constant, the delectric loss factor, the insulation resistance and the track resistance met the standard requirements for high-quality multi layers.

EXAMPLE 3

Application of Layers on circuit boards

The binding agents of Examples 1 and 2 were formulated with pigments, fillers and flow agents and defoaming agents common to the lacquer industry to obtain optimal processing characteristics. The solvent systems used were the glycols, glycol ethers and glycol esters customarily used and the resulting lacquers were applied in a layer to cover the entire surface of a copper-clad support plate. The resulting plates were dried at room temperature and then a stencil was applied thereon. The uncovered areas were exposed to ultraviolet light with a radiation maximum of 380 mm to obtain a tack free surface with adequate cross-linking in 30 seconds. The unexposed areas were removed during the subsequent development process with the developer solution of monomethyl ether of propylene glycol. The exposed areas were resistant to the developer solution due to the ultraviolet pre-cross-linkage and a subsurface cross linkage could not be found.

For use as a solder stop lacquer, the said support plates were then subjected to a thermal treatment with an afterbake at 120° to 230° C. over 20 two 30 minutes depending on the glass transition point desired for the cured layering material after which the soldering operations could be performed.

For the preparation of multilayers, the unexposed areas were also removed with suitable solvents after the ultra-violet pre-cross-linking with the circuit pattern being protected by the ultraviolet pre-cross linked lacquer during the developing process. Then, the unprotected copper surfaces were removed by etching with an ammonium peroxy disulfate ester systems and the resulting support plate was provided with multi-layer by plasticization with an additional prepreg layer. Multi-layers are built up by repeating the process several times and the binders of the invention in the multilayers resulted in high quality finished products because of the execellent through hardening which took place in the troughs between ver high circuit patterns also and because of the favorable elasticity behavior.

Various modifications of the products of the invention may be made without departing from the spirit or scope thereof and it should be understood that the invention is intended to be limited only as defined in the appended claims.

What we claim is:

1. Radiation cross-linked binding agents formed by reacting first an expoxy component with more than one epoxy group per molecule with at least one carboxylic acid in a molar ratio 1 epoxy group per 0.5 to 0.9 carboxyl groups and second reacting the said first reaction product with at least one unsaturated isocyanato carbamate ester prepared by reacting a compound containing at least two isocyanate groups with an ester of an acid selected from the group consisting of acrylic acid, methacrylic acid and cyanacrylic acid containing hydroxyl groups.

2. A binding agent of claim 1 wherein the epoxy component is a novolac whose phenolic hydroxyl group are etherified with glycidyl groups.

3. A binding agent of claim 2 wherein the epoxy component also contains mono- or bifunctional epoxy compounds.

4. A binding agent of claim 1 whose average molecular weight is 500 to 10,000.

5. A binding agent of claim 1 wherein the first reaction product and the isocyanate carbamate ester are reacted in a molar ratio 1 of hydroxyl group per 0.8 to 1 isocyanate group.

6. A binding agent of claim 1 containing a Michler ketone compound as latent catalyst for cross-linkage and thermal curing.

* * * * *